US012537157B2

(12) United States Patent
Chiu et al.

(10) Patent No.: US 12,537,157 B2
(45) Date of Patent: Jan. 27, 2026

(54) SURFACE MOUNT FUSE AND FUSE ELEMENT THEREOF

(71) Applicant: CONQUER ELECTRONICS CO., LTD., New Taipei (TW)

(72) Inventors: Hung-Chih Chiu, New Taipei (TW); Po-Shuo Chiu, New Taipei (TW)

(73) Assignee: CONQUER ELECTRONICS CO., LTD., New Taipei (TW)

( * ) Notice: Subject to any disclaimer, the term of this patent is extended or adjusted under 35 U.S.C. 154(b) by 244 days.

(21) Appl. No.: 18/540,115

(22) Filed: Dec. 14, 2023

(65) Prior Publication Data

US 2025/0118519 A1 Apr. 10, 2025

(30) Foreign Application Priority Data

Oct. 5, 2023 (TW) ................................ 112138350

(51) Int. Cl.
*H01H 85/06* (2006.01)
*H01H 85/00* (2006.01)
*H01H 85/143* (2006.01)

(52) U.S. Cl.
CPC ........ *H01H 85/06* (2013.01); *H01H 85/0047* (2013.01); *H01H 85/143* (2013.01)

(58) Field of Classification Search
CPC ......... H01H 85/06-12; H01H 85/0047; H01H 85/143; H01H 37/761; H01H 85/0411; H01H 2085/0412-0414
See application file for complete search history.

(56) References Cited

U.S. PATENT DOCUMENTS

2004/0196133 A1* 10/2004 Kawanishi ............. H01H 85/06 337/159
2015/0048922 A1* 2/2015 Kimura ............... H01M 50/581 337/401
2021/0183605 A1* 6/2021 Su ........................ H01H 85/046
2022/0230830 A1* 7/2022 Yoneda ................ H01H 85/055

FOREIGN PATENT DOCUMENTS

CN 102623272 A 8/2012
CN 103236380 A 8/2013
JP 2016050909 A 4/2016
JP 2021174575 A 11/2021
TW I674940 B 10/2019
TW M649517 U 12/2023

OTHER PUBLICATIONS

Examination Report of the TW patent application 112138350 and its English translation, Oct. 5, 2023.

* cited by examiner

*Primary Examiner* — Jacob R Crum
(74) *Attorney, Agent, or Firm* — MUNCY, GEISSLER, OLDS & LOWE, P.C.

(57) ABSTRACT

A surface mount fuse and fuse element thereof are disclosed. The fuse element has a lead-free flat fuse, a flux layer, and a porous metal layer. The porous metal layer is bonded on one surface of the lead-free flat fuse through the flux layer. A part of the flux layer penetrates into the porous metal layer through capillary action, so the flux fills the pores of the first porous metal layer to distribute on the lead-free flat fuse evenly. When overcurrent occurs in the current loop and high temperature occurs, the flux layer helps the porous metal layer and the lead-free flat fuse to melt effectively, thereby interrupting the current loop in time.

20 Claims, 8 Drawing Sheets

SURFACE MOUNT FUSE AND FUSE ELEMENT THEREOF

CROSS-REFERENCE TO RELATED APPLICATIONS

This application is based upon and claims priority under 35 U.S.C. 119 from Taiwan Patent Application No. 112138350 filed on Oct. 5, 2023, which is hereby specifically incorporated herein by this reference thereto.

BACKGROUND OF THE INVENTION

1. Field of the Invention

The present invention is related to a fuse, and more particularly to a surface mount fuse and fuse element thereof.

2. Description of the Prior Arts

A surface mount fuse is soldered to a circuit board. When an abnormality such as overcurrent occurs in the current loop on the circuit board, the surface mount fuse immediately interrupts the current loop to protect the circuit board.

A conventional surface mount fuse uses a flat fuse made of tin-lead alloy with a melting point of 290 degrees Celsius. To meet Restriction of Hazardous Substance (RoHS), a material of lead (Pb) is prohibited in the flat fuse. A lead-free flat fuse made of a lead-free alloy is raised accordingly. Tin-bismuth alloy is an example of a lead-free alloy, with a melting point ranging from 245° C. to 250° C. However, the melting point of the tin-bismuth alloy is lower than that of the tin-lead alloy and even lower than the reflow temperature of about 260° C. Therefore, the lead-free flat fuse made of Tin-bismuth alloy melted in the reflow procedure. With reference to FIG. 7, a conventional surface mount fuse has a lead-free flat fuse 51 and two metal layers 52*a* and 52*b*, respectively, mounted on two opposite surfaces of the lead-free flat fuse 51. In addition, a flux 53 is further coated on the first metal layer 52*a* to avoid the first metal layer 52*a* being oxidized and to increase fuse efficiency.

To overcome the shortcomings, the present invention provides a surface mount fuse and fuse element thereof to mitigate or to obviate the aforementioned problems.

SUMMARY

An objective of the present invention is to provide a surface mount fuse and fuse element thereof.

To achieve the objective as mentioned above, the surface mount fuse has:

- a base having a first surface, two electrodes and a heater, wherein the two electrodes and the heater are formed on the first surface and the heater is located between the two electrodes;
- a fuse element electrically connected to the two electrodes and the heater and having:
  - a lead-free flat fuse having a second surface and a third surface opposite to the second surface, wherein the second surface lies across the two electrodes and contacts the heater;
  - a primary flux layer formed on the third surface of the lead-free flat fuse; and
  - a first porous metal layer stacked on the primary flux layer, wherein a periphery of the first porous metal layer does not extend beyond that of the lead-free flat fuse, wherein a part of the primary flux layer penetrates into a plurality of pores of the first porous metal layer and the first porous metal layer is bonded to the third surface of the lead-free flat fuse through the primary flux layer; and
- a hollow cover mounted on the first surface of the base to cover the fuse element therein.

Based on the foregoing description, the surface mount fuse of the present invention mainly forms the primary flux layer on the lead-free flat fuse and then stacks the first porous metal layer on the primary flux layer. Therefore, a part of the primary flux layer penetrates into the first porous metal layer through capillary action. Since the flux fills the pores of the first porous metal layer to distribute on the lead-free flat fuse evenly, the flux in the surface mount fuse of the present invention is evenly distributed and is sufficient. When overcurrent occurs in the current loop and high temperature occurs, the primary flux layer helps the first porous metal layer and the lead-free flat fuse to melt effectively, thereby interrupting the current loop in time.

To achieve the objective as mentioned above, the fuse element of the surface mount fuse has:

- a lead-free flat fuse having a first surface and a second surface opposite to the first surface;
- a primary flux layer formed on the first surface of the lead-free flat fuse; and
- a first porous metal layer stacked on the primary flux layer, wherein a periphery of the first porous metal layer does not extend beyond that of the lead-free flat fuse, wherein a part of the primary flux layer penetrates into a plurality of pores of the first porous metal layer, and the first porous metal layer is bonded to the first surface of the lead-free flat fuse through the primary flux layer.

Based on the foregoing description, the fuse element of the surface mount fuse of the present invention mainly forms the primary flux layer on the lead-free flat fuse and then stacks the first porous metal layer on the primary flux layer. Therefore, a part of the primary flux layer penetrates into the first porous metal layer through capillary action. Since the flux fills the pores of the first porous metal layer to distribute on the lead-free flat fuse evenly, the flux in the surface mount fuse of the present invention is evenly distributed and is sufficient. When overcurrent occurs in the current loop and high temperature occurs, the primary flux layer helps the first porous metal layer and the lead-free flat fuse to melt effectively, thereby interrupting the current loop in time.

Other objectives, advantages and novel features of the invention will become more apparent from the following detailed description when taken in conjunction with the accompanying drawings.

DETAILED DESCRIPTION OF THE EMBODIMENTS

Figure 1B:
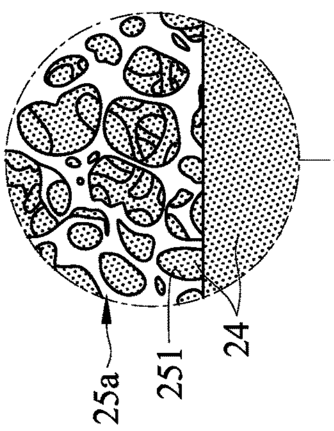
FIG. 1B is an enlarge view in part of FIG. 1A.
Figure 1A:
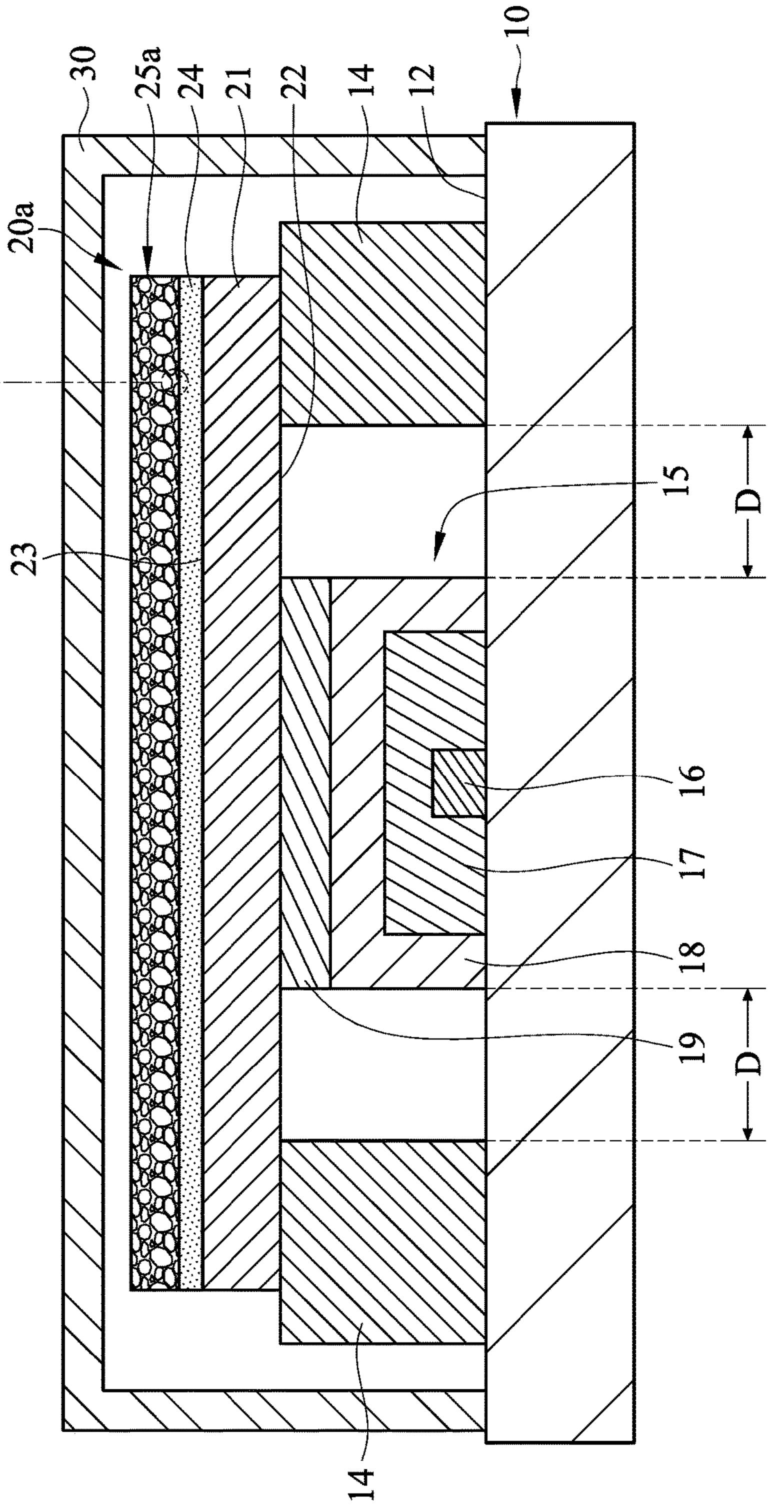
FIG. 1A is a cross-sectional view of a first embodiment of a surface mount fuse in accordance with the present invention.

With reference to FIG. 1A, a first embodiment of a surface mount fuse in accordance with the present invention is shown. The surface mount fuse has a base 10, a first element 20*a*, and a hollow cover 30.

The base is made of an electrical insulating material and has a first surface 12, two electrodes 14 and a heater 15. The two electrodes 14 are formed on the first surface 12. The heater 15 is formed on the first surface 12 and located between the two electrodes 14. A gap D is between each electrode 14 and the heater 15. In one embodiment, with further reference to FIG. 3, the heater 15 has a leading electrode 16, a first conductive layer 17, a heating layer 18, and a second conductive layer 19. The leading electrode 16 is located between the two electrodes 14. The first conductive layer 17 encapsulates the leading electrode 16, and the heating layer 18 encapsulates the first conductive layer 17. The second conductive layer 19 is formed on the heating layer 18. The first and second conductive layers 17, 19 are good conductors of electricity and heat.

The fuse element 20*a* is electrically connected to the two electrodes 14 and the heater 15 on the base 10 and has a lead-free flat fuse 21, a primary flux layer 24 and a first porous metal layer 25*a*.

Figure 3:
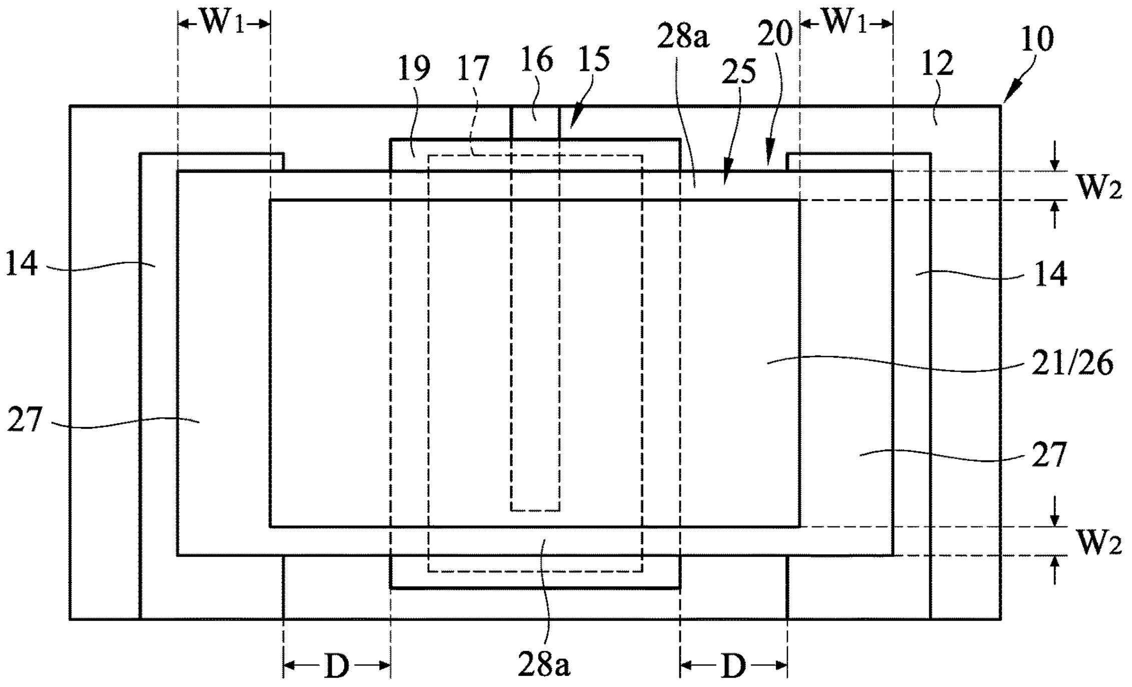
FIG. 3 is a top view of a third embodiment of a fuse element mounted on a base in accordance with the present invention.

The lead-free flat fuse 21 of the fuse element 20*a* has a second surface 22 and a third surface 23. The second surface 22 faces to the first surface 12 of the base 10 and lies across the two electrodes 14 of the base 10. With further reference to FIG. 3, the second surface 22 contacts the heater 15. In particular, the second surface 22 of the lead-free flat fuse 21 contacts the two electrodes 14 and the second conductive layer 19 of the heater 15. Therefore, the lead-free flat fuse 21 is electrically connected to the two electrodes 14 and the heater 15. The third surface 23 of the lead-free flat fuse 21 is opposite to the second surface 22 and away from the first surface 12 of the base 10. To meet RoHS, in the present embodiment, the lead-free flat fuse 21 is made of Sn or Bi or tin-bismuth alloy, but not limited to. When a large current flows through the lead-free flat fuse 21 due to overcurrent, the large current also passes through the second conductive layer 19, the heating layer 18, the first conductive layer 17, and the leading electrode 16. The heating layer 18 of the heater 15 generates heat thereby. At the time, the second conductive layer 19 heats the lead-free flat fuse 21 evenly so the lead-free flat fuse 21 is rapidly heated to its melting point and then melted.

Figure 2A:
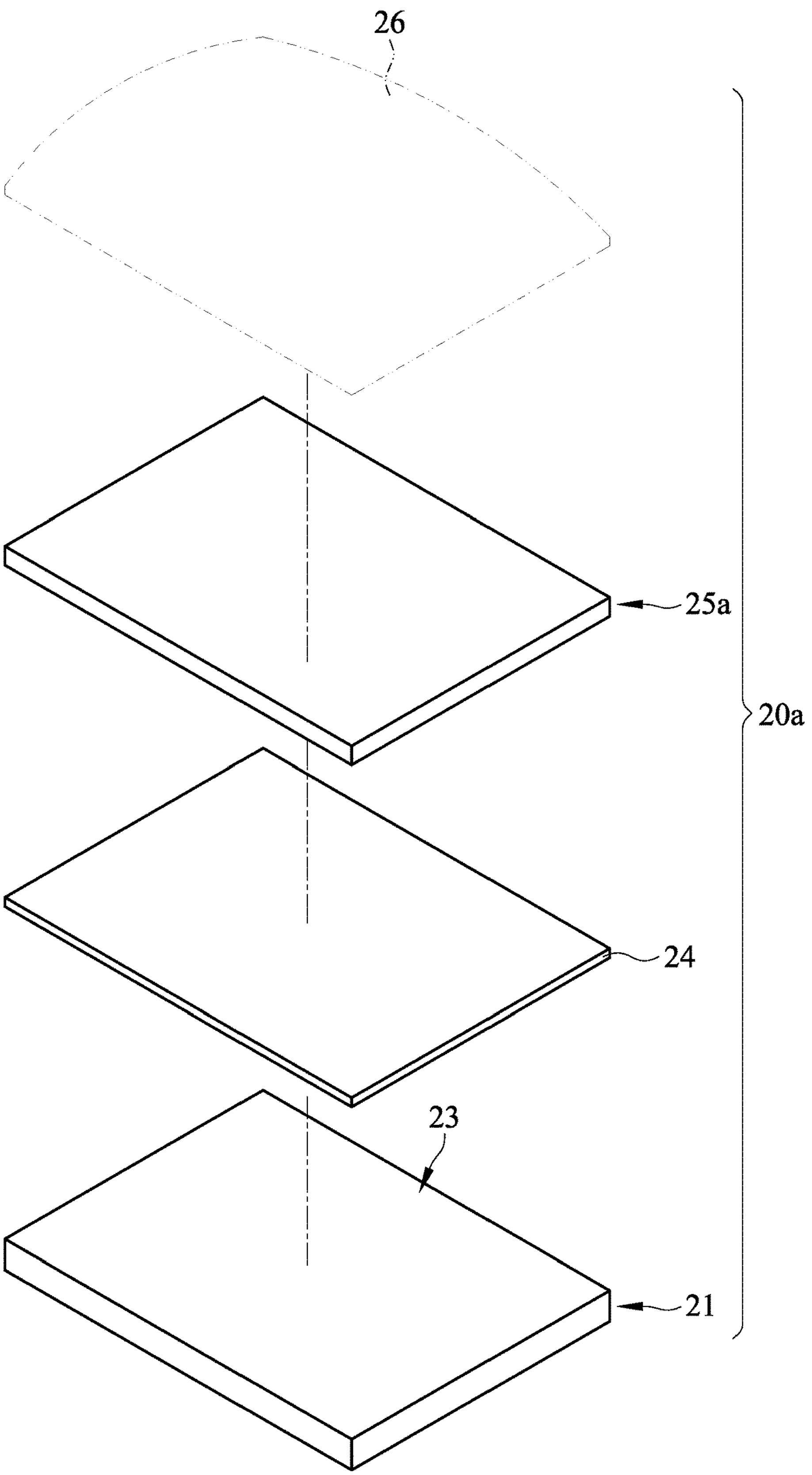
FIG. 2A is a perspective exploded view of a first embodiment of a fuse element of a surface mount fuse in accordance with the present invention.

With further reference to FIG. 2A, the primary flux layer 24 is formed on the third surface 23 of the lead-free flat fuse 21. In one embodiment, the primary flux layer is made of rosin but is not limited thereto. A periphery of the first porous metal layer 25*a* does not extend beyond that of the lead-free flat fuse 21. The first porous metal layer 25*a* stacks on the primary flux layer 24, so the first porous metal layer 25*a* is bonded on the third surface 23 of the lead-free flat fuse 21 through the primary flux layer 24. At the time, a part of the primary flux layer 24 penetrates into the first porous metal layer 25*a* through capillary action. As shown in FIG. 1B, since the flus of the primary flux layer 24 fills a plurality of pores 251 of the first porous metal layer 25*a*, the primary flux layer 24 is evenly distributed on the third surface 23 of the lead-free flat fuse 21. In one embodiment, a melting point of the first porous metal layer 25*a* is greater than that of the lead-free flat fuse 21. In addition, to add more flux, a secondary flux layer 26 may be further formed on the first porous metal layer 25*a*. In another embodiment, the first porous metal layer 25*a* is made of Au, Ag, Cu, Zn or a porous alloy formed by at least two components of Au, Ag, Cu and Zn but is not limited thereto.

Figure 1C:
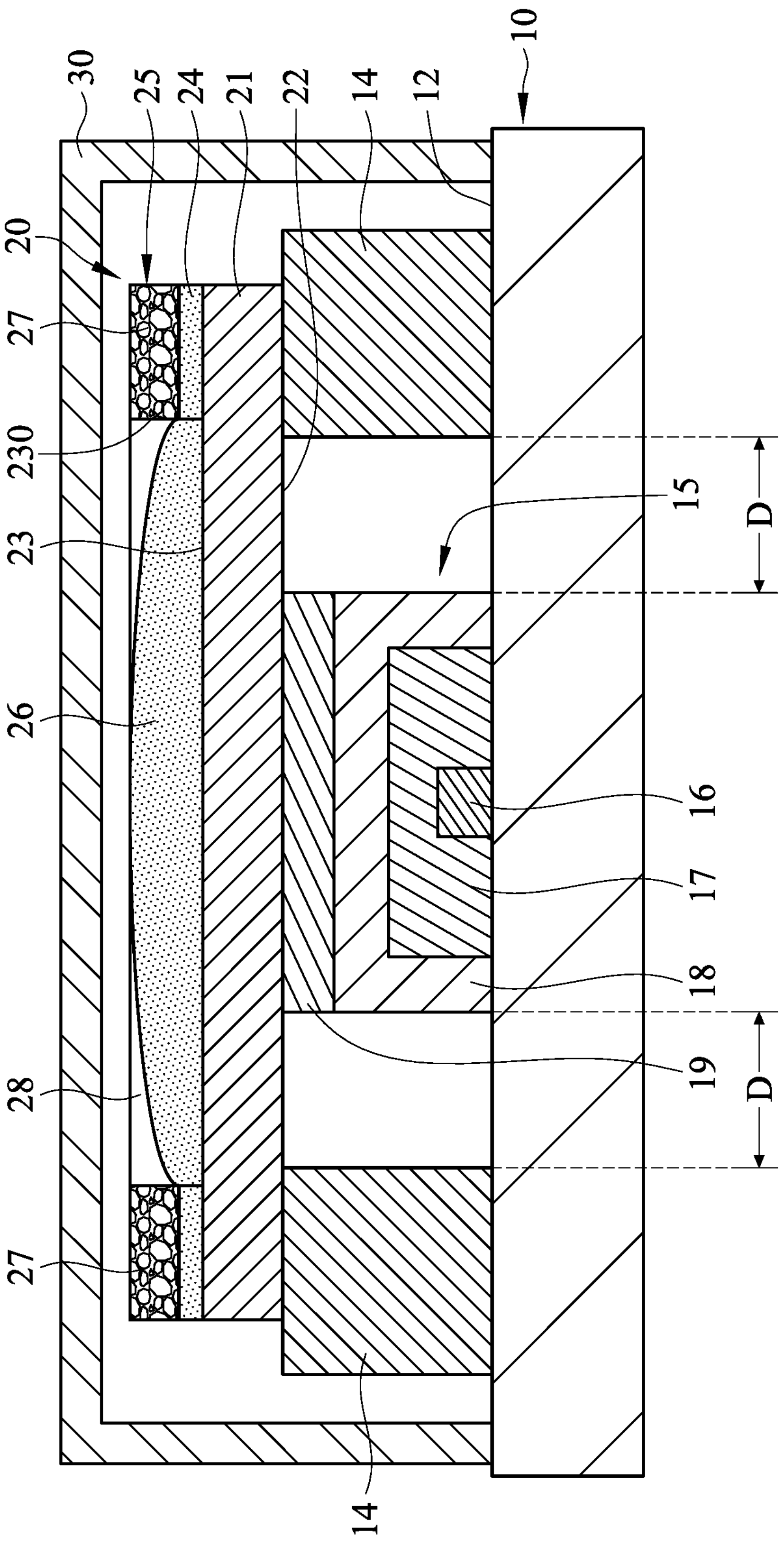
FIG. 1C is a cross-sectional view of a second embodiment of a surface mount fuse in accordance with the present invention.
Figure 2B:
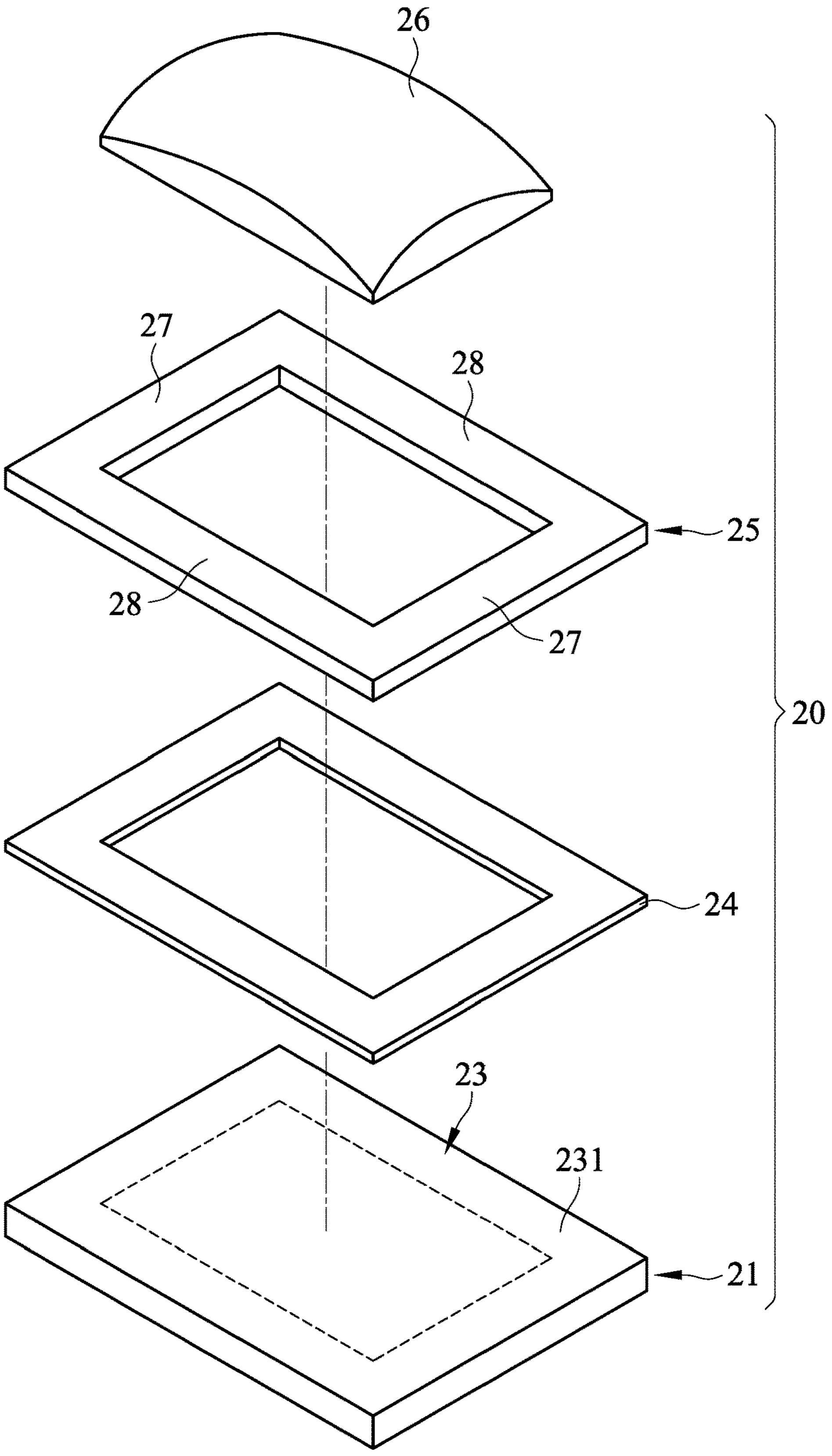
FIG. 2B is a perspective exploded view of a second embodiment of a fuse element of a surface mount fuse in accordance with the present invention.
Figure 4:
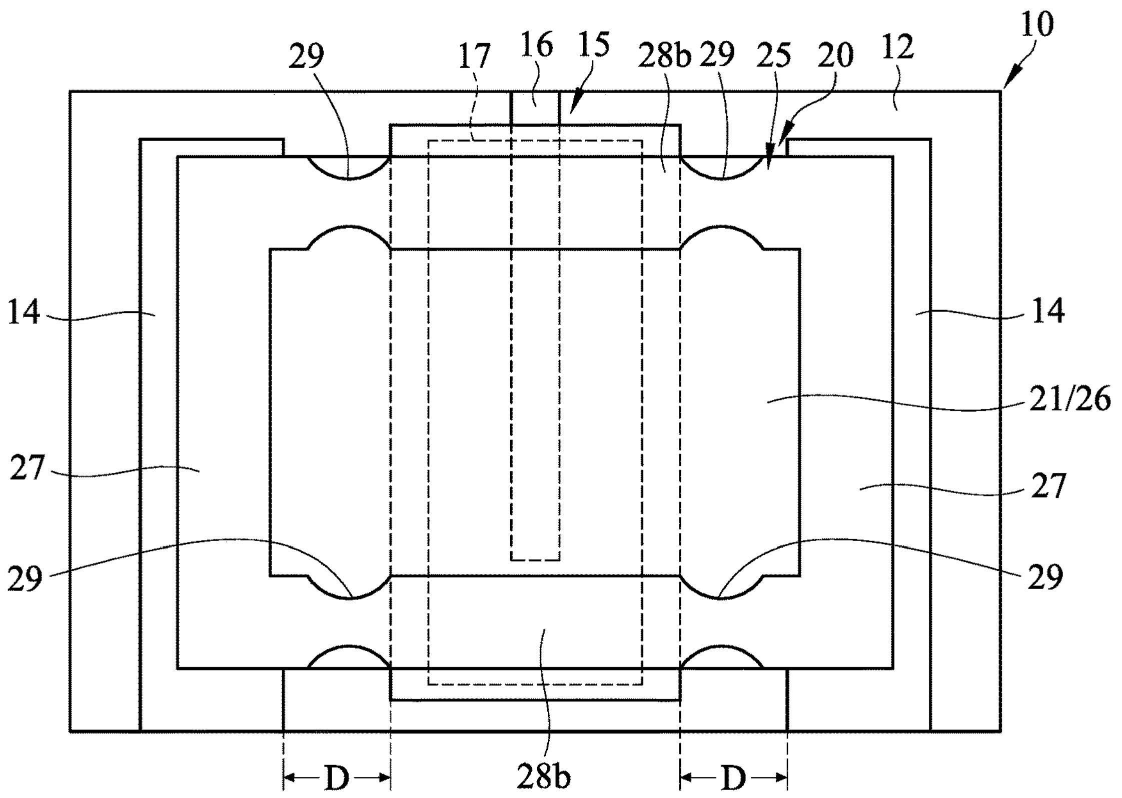
FIG. 4 is a top view of a fourth embodiment of a fuse element mounted on a base in accordance with the present invention.

With reference to FIGS. 1C and 2B, a second embodiment of a surface mount fuse is shown. In the second embodiment, a first porous metal layer 25 of a fuse element 20 is formed as a frame and a primary flux layer 24 is be formed on a peripheral area of the third surface 23 of the lead-free flat fuse 21. The first porous metal layer 25 is bonded on the peripheral area of the third surface 23 of the lead-free flat fuse 21 through the primary flux layer 24. A chamber 230 is defined among the third surface 23, the primary flux layer 24, and the first porous metal layer 25. The secondary flux layer 26 may fill in the chamber 230 to limit a position of the secondary flux layer 26. In one embodiment, the secondary flux layer 26 may further cover a top surface of the first porous metal layer 25. In the present embodiment, the frame-shaped first porous metal layer 25 has two opposite first frame strips 27 and two opposite second frame strips 28. As shown in FIG. 1C, the two first frame strips 27 respectively correspond to the two electrodes 14 of the base 10 and the second frame strips 28 are respectively connected between the two first frame strips 27. In the present embodiment, a width of each first frame strip 27 may be equal to that of each second frame strip 28 or may be different from that of each second frame strip 28, as shown in FIG. 3. For example, in FIG. 3, the first frame strip 27 has a first width W1 and the second frame strip 28*a* has a second width W2. The second width is less than the first width W1 to shorten a melting time when overcurrent occurs. In the present embodiment, a fracture by melting of each second frame strip 28 is usually formed between each electrode 14 and the heater 15 or in the gap D, as shown in FIG. 1C. Therefore, as shown in FIG. 4, at least one notch 29 may be further formed on a fracture by melting each second frame strip 28*b* of another frame-shaped first porous metal layer 25 and a width of the fracture by melting is narrower, thereby to shorten a melting time when overcurrent occurs. In one embodiment, two notches 29 are formed on the fracture by melting of each second frame strip 28*b*.

With reference to FIGS. 1A and 1C, the hollow cover 30 is mounted on the first surface 12 of the base 10 and is made of an electrical insulating material. The hollow cover 30 covers the fuse element 20*a*, 20. In particular, the hollow cover 30 is mounted on the first surface 12 of the base and located outside the two electrodes.

Figure 5:
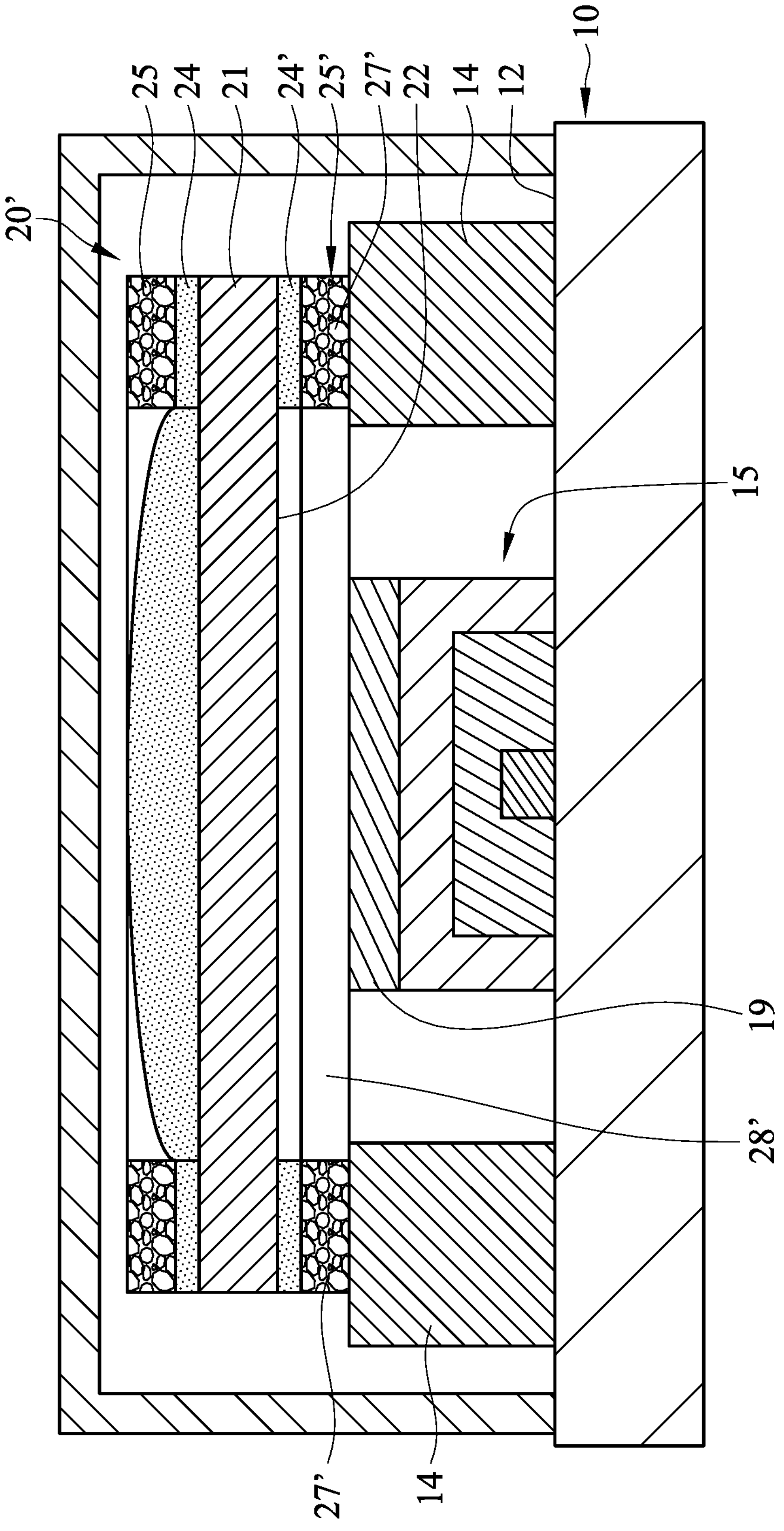
FIG. 5 is a cross-sectional view of a third embodiment of a surface mount fuse in accordance with the present invention.
Figure 6:
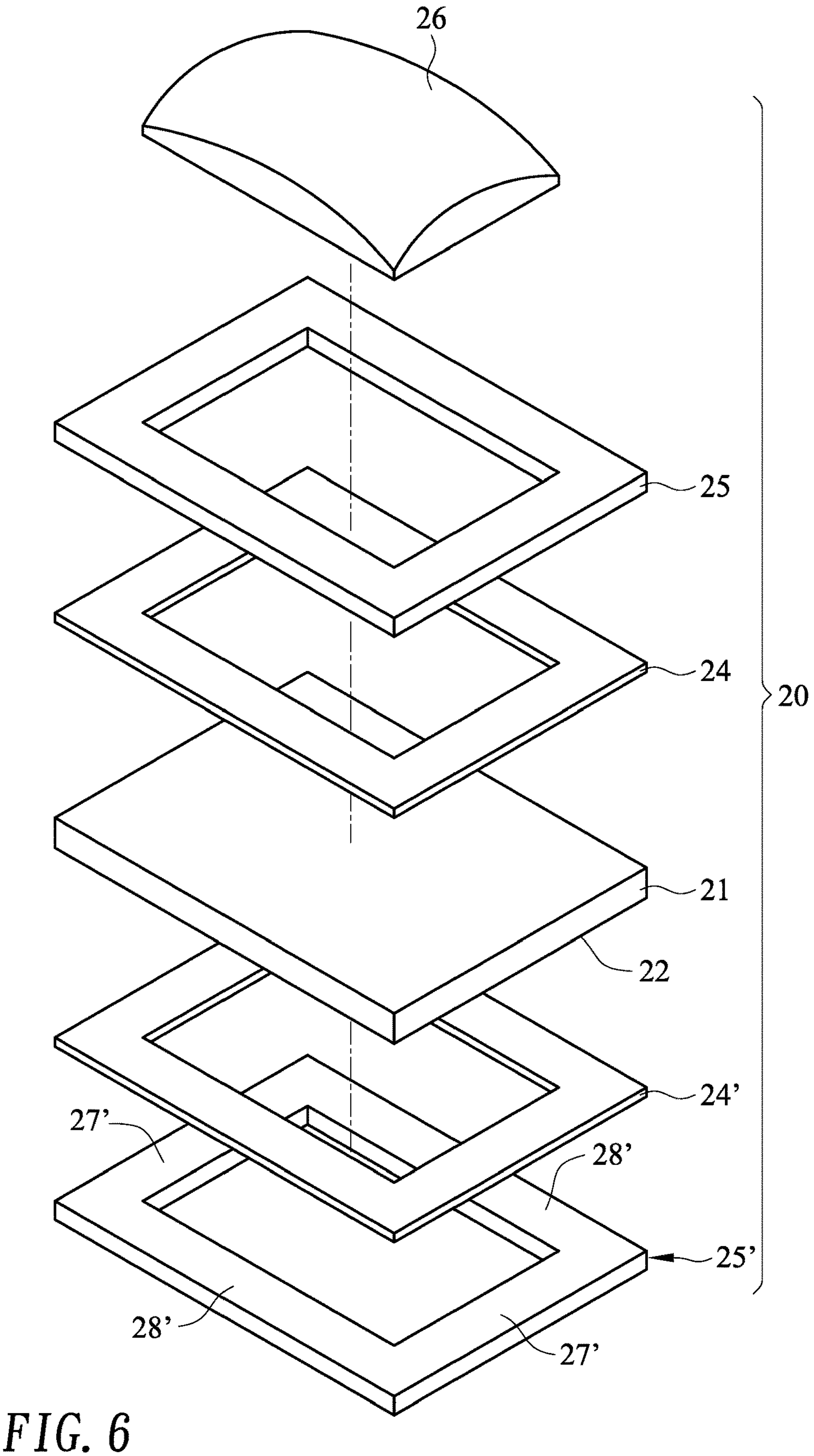
FIG. 6 is a perspective exploded view of the fuse element in FIG. 5.
Figure 7:
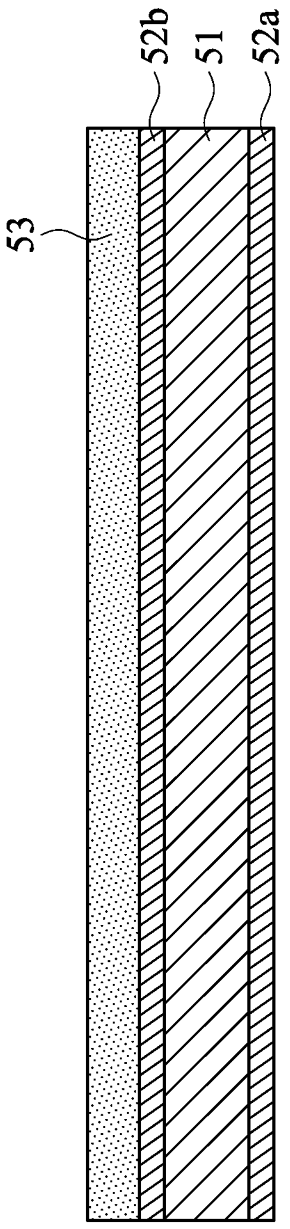
FIG. 7 (PRIOR ART)
FIG. 7 is a cross-sectional view of a conventional surface mount fuse in accordance with the prior art.

With reference to FIGS. 5 and 6, a third embodiment of a surface mount fuse is shown and similar to the second embodiment of FIG. 1C. The difference in the third embodiment is that a fuse element 20' further has an additional flux layer 24' and a second porous metal layer 25'. The additional flux layer 24' is formed on a peripheral area of the second 22 of the lead-free flat fuse 21. The second porous metal layer 25' stacks on the additional flux layer 24' and a part of the flux layer 24' penetrates into the second porous metal layer 25'. The second porous metal layer 25' is bonded on the peripheral area of the second surface 22 of the lead-free flat fuse 21 through the additional flux layer 24'. As shown in FIG. 5, the second porous metal layer 25' lies across the two electrodes 14 and contacts the second conductive layer 19. The second porous metal layer 25' is electrically connected to the two electrodes 14 and the heater 15. In one embodiment, the second porous metal layer 25' may be the same as the second porous metal layer 25 of FIG. 1C and has two opposite third frame strip 27' and two opposite fourth frame strip 28'. Each fourth frame strip 28' may be the same as the second frame strip 28*a* of FIG. 3 and the second frame strip 28*b* of FIG. 4. In addition, the second surface of the lead-free flat fuse 21 of the fuse element 20*a* may be bonded to a second porous metal layer matching the first porous metal layer 25*a* through an additional flux layer.

Based on the foregoing description, the surface mount fuse as described mainly forms the primary flux layer on the lead-free flat fuse and then stacks the first porous metal layer on the primary flux layer. Therefore, a part of the primary flux layer penetrates into the first porous metal layer through capillary action. Since the flux fills the pores of the first porous metal layer to distribute on the lead-free flat fuse evenly, the flux in the surface mount fuse as described is evenly distributed and is sufficient. A bonding strength therebetween is also enhanced. When overcurrent occurs in the current loop and high temperature occurs, the primary flux layer helps the first porous metal layer and the lead-free flat fuse to melt effectively, thereby interrupting the current loop in time.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A fuse element of a surface mount fuse comprising:
a lead-free flat fuse having a first surface and a second surface opposite to the first surface;
primary flux layer formed on the first surface of the lead-free flat fuse; and
a first porous metal layer stacked on the primary flux layer, wherein a periphery of the first porous metal layer does not extend beyond that of the lead-free flat fuse, wherein a part of the primary flux layer penetrates into a plurality of pores of the first porous metal layer, and the first porous metal layer is bonded to the first surface of the lead-free flat fuse through the primary flux layer.

2. The fuse element as claimed in claim 1, wherein a melting point of the first porous metal layer is greater than that of the lead-free flat fuse.

3. The fuse element as claimed in claim 1, wherein
the primary flux layer is formed on a peripheral area of the first surface of the lead-free flat fuse; and
the first porous metal layer is formed as a frame and has two opposite first frame strips, each of which has a first width; and
two opposite second frame strips, and each of the second frame strips having a second width, wherein the two second frame strips are respectively connected between the two first frame strips and the second width is the same or less than the first width.

4. The fuse element as claimed in claim 3, wherein
the primary flux layer is formed on a peripheral area of the first surface of the lead-free flat fuse; and
the first porous metal layer is formed as a frame and has two opposite first frame strips; and
two opposite second frame strips respectively connected between the two first frame strips, wherein at least two notches are respectively formed on each of the second frame strips and close to the two first frame strips.

5. The fuse element as claimed in claim 2 further comprising a secondary flux layer formed on a top surface of the first porous metal layer.

6. The fuse element as claimed in claim 3 further comprising a secondary flux layer filling a chamber defined among the first surface of the lead-free flat fuse, the primary flux layer and the first porous metal layer.

7. The fuse element as claimed in claim 4 further comprising a secondary flux layer filling a chamber defined among the first surface of the lead-free flat fuse, the primary flux layer and the first porous metal layer.

8. The fuse element as claimed in claim 2 further comprising:
an additional flux layer formed on the second surface of the lead-free flat fuse; and
a second porous metal layer stacked on the additional flux layer, wherein a part of the additional flux layer penetrates into a plurality of pores of the second porous metal layer, and the second porous metal layer is bonded to the second surface of the lead-free flat fuse through the additional flux layer, wherein a melting point of the second porous metal layer is greater than that of the lead-free flat fuse.

9. The fuse element as claimed in claim 3 further comprising:
an additional flux layer formed on the second surface of the lead-free flat fuse; and
a second porous metal layer stacked on the additional flux layer, wherein a part of the additional flux layer penetrates into a plurality of pores of the second porous metal layer, and the second porous metal layer is bonded to the second surface of the lead-free flat fuse through the additional flux layer, wherein a melting point of the second porous metal layer is greater than that of the lead-free flat fuse.

10. The fuse element as claimed in claim 4 further comprising:
an additional flux layer formed on the second surface of the lead-free flat fuse; and
a second porous metal layer stacked on the additional flux layer, wherein a part of the additional flux layer penetrates into a plurality of pores of the second porous metal layer, and the second porous metal layer is bonded to the second surface of the lead-free flat fuse through the additional flux layer, wherein a melting point of the second porous metal layer is greater than that of the lead-free flat fuse.

11. The fuse element as claimed in claim 5 further comprising:
an additional flux layer formed on the second surface of the lead-free flat fuse; and
a second porous metal layer stacked on the additional flux layer, wherein a part of the additional flux layer penetrates into a plurality of pores of the second porous metal layer, and the second porous metal layer is bonded to the second surface of the lead-free flat fuse through the additional flux layer, wherein a melting point of the second porous metal layer is greater than that of the lead-free flat fuse.

12. The fuse element as claimed in claim 8, wherein the additional flux layer is formed on a peripheral area of the second surface of the lead-free flat fuse; and the second porous metal layer is formed as a frame and has two opposite third frame strips, and each of the third frame strips having a first width; and two opposite fourth frame strips, and each of the fourth frame strips having a second width, wherein the two fourth frame strips are respectively connected between the two third frame strips, and the second width is the same or less than the first width.

13. The fuse element as claimed in claim 9, wherein the additional flux layer is formed on a peripheral area of the second surface of the lead-free flat fuse; and the second porous metal layer is formed as a frame and has:

two opposite third frame strips, and each of the third frame strips having a first width; and two opposite fourth frame strips, and each of fourth frame strips having a second width, wherein the two fourth frame strips are respectively connected between the two third frame strips, and the second width is the same or less than the first width.

14. The fuse element as claimed in claim 10, wherein the additional flux layer is formed on a peripheral area of the second surface of the lead-free flat fuse; and the second porous metal layer is formed as a frame and has:

two opposite third frame strips, and each of the third frame strips having a first width; and two opposite fourth frame strips, and each of the fourth frame strips having a second width, wherein the two fourth frame strips are respectively connected between the two third frame strips, and the second width is the same or less than the first width.

15. The fuse element as claimed in claim 8, wherein the additional flux layer is formed on a peripheral area of the second surface of the lead-free flat fuse; and the second porous metal layer is formed as a frame and has:

two opposite third frame strips; and two opposite fourth frame strips respectively connected between the two third frame strips, wherein at least two notches are respectively formed on each of the second frame strips and close to the two first frame strips.

16. The fuse element as claimed in claim 9, wherein the additional flux layer is formed on a peripheral area of the second surface of the lead-free flat fuse; and the second porous metal layer is formed as a frame and has:

two opposite third frame strips; and two opposite fourth frame strips respectively connected between the two third frame strips, wherein at least two notches are respectively formed on each of the second frame strips and close to the two first frame strips.

17. The fuse element as claimed in claim 10, wherein the additional flux layer is formed on a peripheral area of the second surface of the lead-free flat fuse; and the second porous metal layer is formed as a frame and has:

two opposite third frame strips; and two opposite fourth frame strips respectively connected between the two third frame strips, wherein at least two notches are respectively formed on each of the second frame strips and close to the two first frame strips.

18. The fuse element as claimed in claim 5, wherein a material of the lead-free flat fuse is Sn or Bi or tin-bismuth alloy;

the primary and secondary flux layers is are made of rosin; and a material of the first porous metal layer is Au, Ag, Cu, Zn or a porous alloy formed by at least two components of Au, Ag, Cu and Zn.

19. A surface mount fuse comprising:

a base having a first surface, two electrodes and a heater, wherein the two electrodes and the heater are formed on the first surface of the base and the heater is located between the two electrodes;

a fuse element as claimed in any one of claims 1 to 18, wherein the second surface of the lead-free flat fuse lies across the two electrodes of the base and contacts the heater; and a hollow cover mounted on the first surface of the base to cover the fuse element therein.

20. The surface mount fuse as claimed in claim 11, wherein the heater comprises:

a leading electrode formed on the first surface of the base and located between the two electrodes;

a first conductive layer formed on the first surface of the base and encapsulating the leading electrode;

a heating layer formed on the first surface of the base and encapsulating the first conductive layer; and a second conductive layer formed on the heating layer and contacts the second surface of the lead-free flat fuse of the fuse element.

* * * * *